United States Patent [19]

Göb et al.

[11] Patent Number: 4,690,103

[45] Date of Patent: Sep. 1, 1987

[54] VISCOUS FAN COUPLING UNIT

[75] Inventors: Werner Göb, Kürnach; Peter Anders, Schweinfurt, both of Fed. Rep. of Germany

[73] Assignee: Fichtel & Sachs AG

[21] Appl. No.: 848,812

[22] Filed: Apr. 4, 1986

[30] Foreign Application Priority Data

Apr. 17, 1985 [DE] Fed. Rep. of Germany ....... 3513785

[51] Int. Cl.⁴ ............................................. F01P 5/02
[52] U.S. Cl. ................................. 123/41.12; 192/82 T
[58] Field of Search ................... 123/41.12; 192/82 T, 192/85 R

[56] References Cited

U.S. PATENT DOCUMENTS

| 4,386,585 | 6/1983 | Kittel et al. | 192/82 T |
| 4,502,580 | 3/1985 | Clancey | 192/82 T |
| 4,556,138 | 12/1985 | Martin et al. | 192/82 T |
| 4,633,994 | 1/1987 | Light | 192/82 T |

FOREIGN PATENT DOCUMENTS 2092273 8/1982 United Kingdom ............. 192/82 T

Primary Examiner—William A. Cuchlinski, Jr.
Attorney, Agent, or Firm—Toren, McGeady & Associates

[57] ABSTRACT

A viscous fan coupling unit is controlled by a bimetallic strip. The bimetallic strip is subdivided by an elongate slot into two partial strips. The partial strips are interconnected by end portions of the bimetallic strip and by a cross-piece. The cross-piece acts on a control pin of the viscous fan coupling. This bimetallic stream reacts immediately on temperature changes of the air strip passing around the bimetallic strip. By the slot internal stresses are avoided such that the bimetallic strip can provide larger deflection paths and larger control forces in response to temperature changes.

7 Claims, 4 Drawing Figures

VISCOUS FAN COUPLING UNIT

BACKGROUND OF THE INVENTION

The invention relates to a viscous fan coupling for controlling the drive system of a cooling air fan through a bimetallic element arranged in the air current behind the radiator on the front of the fan clutch, which element possesses an elongate contour, is supported at its two short sides and cooperates in its middle region with a control member acting onto the fan coupling unit.

STATEMENT OF THE PRIOR ART

A viscous fan coupling of the above-stated kind of construction is known for example from U.S. Pat. 4,386,585. A further viscous fan coupling unit of this type is described and claimed in German Patent Application P 34 42 103.3 (Fichtel & Sachs Case 1008) corresponding to U.S. patent application Ser. No. 789,622, British Patent Application No. 8,525,522 and French Patent Application No. 8,516,068.

In the older construction the bimetallic strips have two short pegs in the region of each of its two end portions which pegs are hooked into a corresponding fixture on the front of the fan coupling unit. In the region between these pegs the bimetallic strip acts upon a control member which extends into the interior of the fan coupling unit. The bimetallic strip lies with its entire area transverse to the direction of flow of the cooling air which sweeps through the radiator of the internal combustion engine. The bimetallic strip reacts with a corresponding greater or lesser flexure to fluctuations of the temperature of this cooling air. Thus it acts through its middle region upon the control member and controls the torque transmission in the interior of the fan coupling unit.

OBJECT OF THE INVENTION

Bimetallic strips of the above-stated style of construction must be able to transmit considerable forces through a considerable operation path. Moreover the operating action must be carried out within the smallest possible temperature range. These different requirements lead in some cases to heavily stressed bimetallic strips which can tend to crack formations in long-term operation. Such cracks in the surface of a bimetallic strip lead to premature failure and thus endanger the cooling system of the internal combustion engine.

It is the object of the present invention to improve bimetallic strips of the above-stated style of construction to such effect that with equal or even better function they are adequate for long-term use.

SUMMARY OF THE INVENTION

A fan coupling unit for controlling the operation of a fan provides a cooling stream for an internal combustion engine system. The coupling unit comprises two rotor units rotatable about a common axis and defining at least one gap between them. The gap is fillable with a viscous liquid. The fan coupling unit further comprises a control member controlling the torque transmitting condition of the viscous liquid within said gap in response to temperature. The control member is engageable with a bimetallic element having the shape of an elongate bimetallic strip with a long axis and a short axis perpendicular to the long axis. The bimetallic strip has end portions spaced along the long axis and supported by respective support members. An intermediate portion acts onto the control member. The bimetallic strip has a separation slot extending substantially along the long axis and definies two partial strips of the elongate strip. The partial strips are interconnected with each other by the end portions and by a cross-piece located in the area of the intermediate portion.

Due to the division of an elongate bimetallic strip into at least two partial strips each of approximately half width, the two strips being connected with on another in the region of the end portions and additionally also in the region of the cross-piece, firstly a satisfactory operating movement is achieved which is the more favourable, the greater the ratio of length to width is made, and nextly by the combination of two of these partial strips an adequate operating force is achieved. On the other hand the construction form divided in the longitudinal direction suppresses the otherwise occurring transverse curvature, which on the one hand acts against good operating function and on the other hand can cause partial overloadings in the material of the bimetallic element. Moreover, better response sensitivity is guaranteed since the heated cooling air can flow better around the bimetallic strip, for example through the separating slot. Thus zones dead to cooling air in the back of the bimetallic element are precluded.

The bimetallic strip can have a somewhat lozenge-shaped configuration in which case the separating openings extend with their contours substantially parallel to this approximately lozenge-shaped external contour. This results in considerably larger separating openings so that the flow of the air around the bimetallic strip is again improved and furthermore for a predetermined contour the effective longitudinal extent of the partial strips can be increased. These measures considerably improve the response behaviour of the bimetallic strip.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will next be explained in greater detail by reference to examples of embodiment. In detail.

DESCRIPTION OF THE PREFERRRED EMBODIMENT

Figure 1:
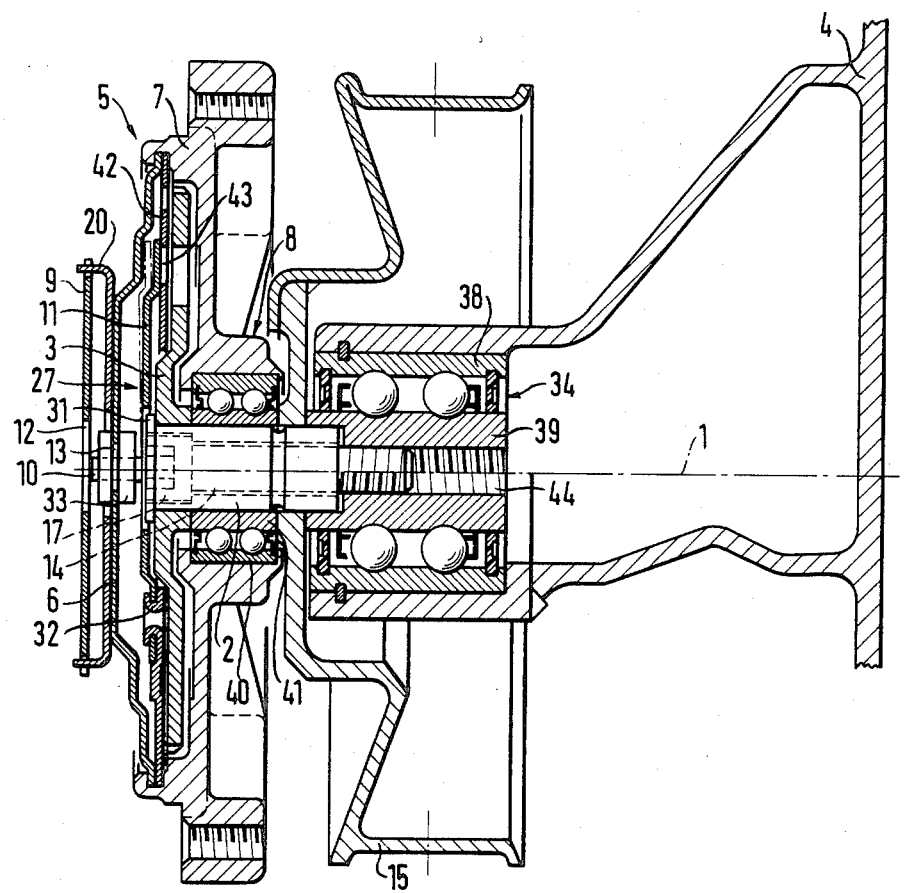
FIG. 1 shows a longitudinal section through a fan coupling unit of this invention.

FIG. 1 shows a longitudinal section of the fan coupling unit. The fan blades screwed to the housing rear wall 7 are not illustrated. In the present case, a shaft 2 is rotatably mounted together with the inner race ring 39 on the internal combustion engine 4 through a bearing arrangement 34 having an inner race ring, an outer race ring 38 and appropriate rolling bodies. The shaft 2 and the inner race ring 39 are both driven from a rotating part of the internal combustion engine 4 by a drive member 15, in the present case in the form of a belt pulley. However, it is also possible that the internal combustion engine 4 comprises a rotating shaft extending to the exterior, said shaft being provided in lieu of the inner race ring 39, in which case the drive member 15 could be omitted. The drive member 15 and the inner race ring 39 rotate about the axis of rotation 1. The entire fan coupling is now screwed to the inner race ring 39 by means of the shaft 2 and the screw 14. In order to make a counter-holding possible, for example, on the drive member 15 during fitting, the latter and also the inner race ring 39 each are irrotatably engaged with the shaft 2, for example, by planar engagement faces, where the two parts are penetrated by the shaft 2. On the shaft 2, starting from the inner race ring 39, the following parts are arranged one behind the other: the drive member 15 in the form of a belt pulley, the inner race ring 41 of the bearing 8 and the rotor 3. All these parts are axially braced and held in axial direction by the screw 14 and by means of the collar 31 of the shaft 2. The rear wall 7 of the housing 5 is rotatably mounted on the outer race ring 40 of the bearing 8, the housing 5 also comprising a housing front wall 6. The rotor 3 extends within the housing 5—between the housing rear wall 7 and the housing front wall 6—and forms torque transmission surfaces with the inner walls of the housing 5. In addition, the housing 5 is partially provided with a shear liquid for the torque transmission. For the regulation of the torque transmission, between the housing front wall 6 and the rotor 3 a partition 42 is provided having at least one valve opening 43 which is controlled by a valve lever 11 in response to the prevailing external temperature. On the outside of the front wall 6 of the housing a holder 20 is arranged which carries an actuator member 9. This actuator member 9 is a bimetallic element. This actuator member 9 acts through two pins 10 upon the valve lever 11. These pins extend in parallel to the axis of rotation 1 opposite to one another at equal distances from the axis and are slidably mounted in the housing front wall 6 such as to act upon the valve lever 11, which has a shape similar to the shape of the actuator member 9. The valve lever 11 is secured with its one end by a rivet 32 to the partition 42, extends beyond the axis of rotation 1 to the opposite side, covers the valve opening 43 in the partition 42, and has in the region of the axis of rotation 1 an opening 27 serving for the introduction of the key for tightening the screw 14. Moreover, in the housing front wall 6, an opening 13 is provided which may be closed by a bung 33, and furthermore in the actuator member 9 an opening 12 is also provided. All these openings 12, 13, 27 have a diameter smaller than the distance between the two pins 10.

The assembly and operation of the liquid friction coupling are as follows:

Only the bearing 34 is fitted on the internal combustion engine 4. The liquid friction coupling is preassembled completely with the fan blades (not shown), without the bung 33. Now the drive member 15 is pushed onto the free end of the shaft 2 protruding from the fan coupling and the shaft 2 is introduced into the corresponding bore of the inner race ring 39. There is a torque transmitting connection between the shaft 2 on the one hand and the drive member 15 and the inner race ring 39 on the other hand, so that the screw 14, preferably made as a screw having a hexagonal recess, can be tightened in the threading 44 of the inner race ring 39—by counter-holding on the drive part 15. Finally, the bung 33 is inserted into the opening 13 of the housing front wall 6, in order to keep dirt out of the interior of the liquid friction coupling and to prevent loss of liquid. Due to the formation of the opening 13 with a diameter smaller than that of the head 17 of the screw 14 it is possible, even without the bung 33, to arrange the screw 14 in the liquid friction coupling so that it cannot be lost. This quite substantially facilitates the fitting of the liquid friction coupling, if it is taken into consideration that such accessories are normally purchased completely from the motor vehicle manufacturers.

The radiator (not shown) of the liquid-cooled internal combustion engine is arranged—seen in the direction of travel—in front of the liquid friction coupling, i.e. on the left side of FIG. 1, so that the air stream flowing through the radiator, after being heated, flows around the liquid friction coupling. Below a predetermined temperature level the rotor 3, driven through the drive member 15 by the internal combustion engine, transmits only a very low torque to the housing 5 and thus to the fan blades. Now, the actuator member 9 is in the position as illustrated and its stress force effects, through the pins 10 and the valve lever 11, that the valve opening 43 is closed. If now the temperature in the radiator rises, the actuator member 9 is heated correspondingly, and from a predetermined temperature level the actuator member 9 domes forward, i.e. to the left in FIG. 1, and through the pins 10 liberates the valve lever 11, so that the valve opening 43 is no longer closed. The torque transmission capacity of the coupling is thereby greatly increased, so that the slip between the rotor 3 and the housing 5 is reduced and the fan blades are driven faster so as to support the cooling of the radiator. This condition persists unitl the temperature level has again dropped below the predetermined level. It is presumably not necessary to explain further that the openings 12, 13 and 27 are arranged concentrically in relation to the axis of rotation 1 and the two pins 10 are provided preferably on a line perpendicular to the connecting line between rivet 32 and valve opening 43, said connection line extending through the axis of rotation 1. This arrangement provides a satisfactory transmission of the control movements from the actuator member 9 to the valve lever 11.

While in FIG. 1 the bimetallic element 9 is of conventional shape as shown in U.S. Pat. No. 4,386,585, FIGS. 2, 3 and 4 show bimetallic elements in accordance with the present invention.

Figure 2:
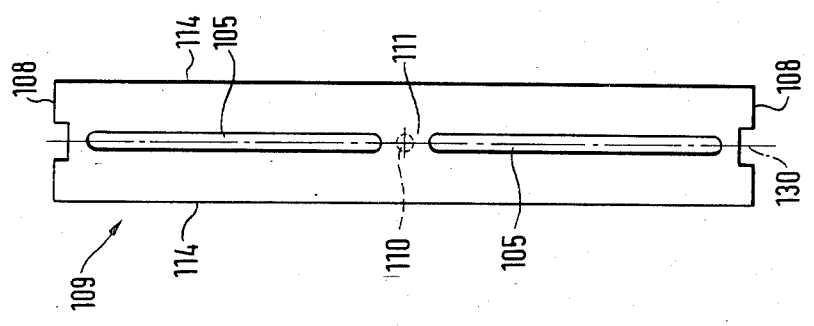
FIG. 2 shows the elevation of a bimetallic strip with rectangular basic form of this invention.

FIG. 2 shows a bimetallic element 109 of rectangular basic form. The two end portions 108 are provided each with a small recess for the securing of the bimetallic element 109 to the support member 20 as shown in FIG. 1. These recesses are not essential to the invention. The two partial strips 114 extend parallel with one another along the longitudinal axis 130 and possess a longitudinal extent of a plurality of times the widthes of the end portions 108. The bimetallic element 109 is divided into two partial strips 114 due to the fact that in the middle of the bimetallic element 109 and parallel with the longitudinal axis 130, tow separating openings 105 are provided which extend longitudinally and each commence in the vicinity of the end portions 108, extend in the direction towards the middle and there terminate each shortly before the middle in order to produce a crosspiece 111 between the two strips 105 in the middle region. The control member 110 corresponding to the pins 10 of FIG. 1, which extends towards the valve lever 11 of FIG. 1 is also arranged in this cross-piece region. The division of the bimetallic element 109 into two partial strips of rectangular basic form extending parallel with one another and the connection of these two strips 114 both at the end portions 108 and in the middle region improve both the response sensivity of the bimetallic element 109 and its operating path and operating force. Furthermore, the life of this component is substantially lengthened. The air flowing on to the bimetallic element 109, the temperature of which air effects the movement of the bimetallic element 109, can flow through the separating openings 105 around all regions of the back of the bimetallic element 109 so that the reaction of the bimetallic element 109 to temperature variations can take place immediately. Furthermore, these separating openings 105 achieve a substantial improvement of the operating behaviour as regards operating path and operating force. This can be explained by the fact that in a bimetallic element 109 of the same external contour without separating openings 105, considerably higher internal material stresses occur due to the transverse stressing. This transverse stressing in the direction perpendicular to the longitudinal axis 130 can be counteracted by these separating openings 105, whereby the ratio of length of the partial strips 114 to the width perpendicular to the longitudinal axis 130 is enlarged, which is to the benefit of the operating path and furthermore, the necessary operating force can be at least maintained in that two strips arranged parallel with one another are provided. These two strips are connected with one another by the end portions 108 and in the region of the transmission member 110 approximately in the middle.

The reduction of these transverse stressings also results in a longer life.

Figure 4:
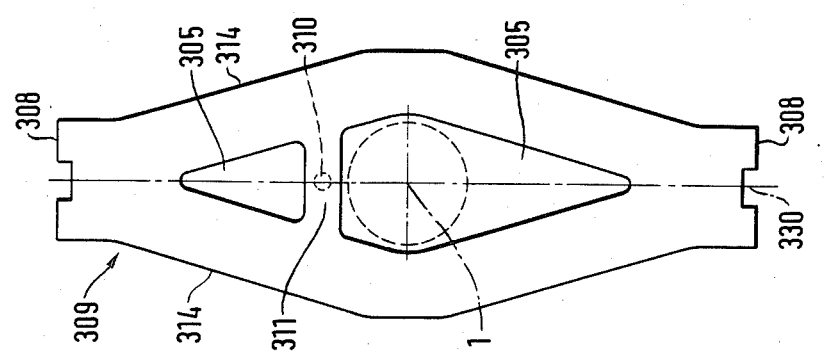
FIGS. 3 and 4 show lozenge-shaped configurations of the bimetallic strip in one case with central arrangement and in the other with non-central arrangement of the control element.
Figure 3:
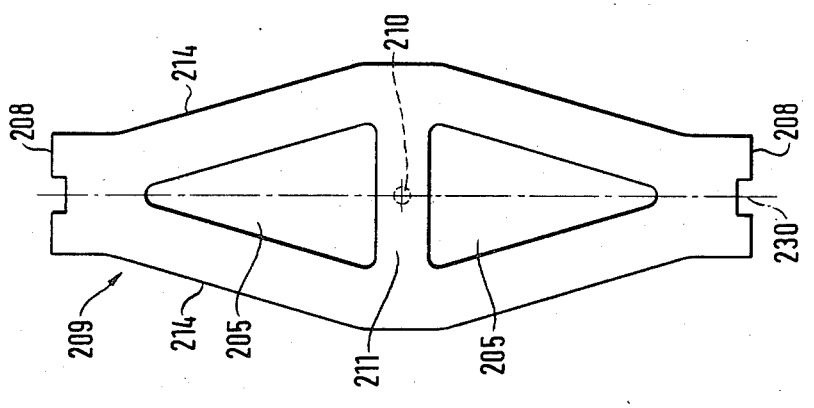

FIGS. 3 and 4 show a modified form of construction. In both forms of embodiment equally the partial strips 214 and 314, respectively, of the bimetallic elements 209 and 309 have a somewhat lozenge-shaped configuration. The two partial strips 214, 314 are connected with one another by the end portions 208, 308 and possess an increasing spacing from one another in the direction towards the longitudinal middle of the bimetallic element 209, 309. The bimetallic element 209 according to FIG. 3 also has a cross-piece 211 in the middle region for the connection of the two partial strips 214, and this cross-piece 211 actuates the control member 210 arranged centrally in the clutch unit. Due to the lozenge-shaped formation of the long sides of the partial strips 214 for the one part and due to the substantially constant width of the partial strips 214, two separating openings 205 result having approximately triangular form. Due to this configuration firstly a greater effective length of the two partial strips 214 is achieved, which has a favourable effect upon the actuating path. Moreover, the separating openings 205 have become quite large, whereby the flowing of the cooling air around the entire bimetallic element 209 is especially effective. Furthermore, the advantages of the bimetallic element 109 according to FIG. 2 are also valid in this embodiment. The bimetallic element 309 according to FIG. 4 is made slightly differenently from FIG. 3. In the element 309 the cross-piece 311 for the connection of the two partial strips 314 is arranged out of center, which is advantageous especially in those cases where the fan clutch is secured from the front by a central screw through the bimetallic element as shown in FIG. 1. This results in an eccentric arrangement of the control member 310, in the region of which then the cross-piece 311 also extends. In addition to the advantages of the bimetallic elements 109 and 209 in the case of an embodiment according to FIG. 4 the advantageous central fastening for the entire fan clutch results. Admittedly for this the separating openings 305 are made of unequal sizes.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A fan coupling unit for controlling the operation of a fan providing a cooling stream for an internal combustion engine system, said coupling unit comprising two rotor units rotatable about a common axis and defining at least one gap between them, said gap being fillable with a viscous liquid, said fan coupling unit further comprising a control member (110, 210, 310) controlling the torque transmitting condition of said viscous liquid within said gap in response to temperature, said control member (110, 210, 310) being engageable with a bimetallic element (109, 209, 309) having the shape of an elongate bimetallic strip with a long axis (130, 230, 330) and a short axis perpendicular to said long axis, said bimetallic strip (109, 209, 309) having end portions (108, 208, 308) spaced along said long axis (130, 230, 330) and supported by respective support members (20), and an intermediate portion acting onto said control member (110, 210, 310), said bimetallic strip (109, 209, 309) having a separation slot (105, 205, 305) extending substantially along said long axis (130, 230, 330) and defining at least two partial strips (114, 214, 314) of said elongate strip (109, 209, 309), said partial strips (114, 214, 314) being interconnected with each other by said end portions (108, 208, 308) and by at least one cross-piece (111, 211, 311) located in the area of said intermediate portion.

2. A fan coupling unit as set forth in claim 1, said bimetallic element (208, 308) having a substantially lonzenge-shaped configuration with a long axis (230, 330) and a short axis, said cross-piece (211, 311) being located adjacent said short axis.

3. A fan coupling unit as set forth in claim 1, said cross-piece (11, 211, 311) being engageable with said control member (110, 210, 310).

4. A fan coupling unit as set forth in claim 1, said long axis (130, 230, 330) of said elongate strip (109, 209, 309) intersecting the common axis (1) of said rotor units.

5. A fan coupling unit as set forth in claim 4, said cross-piece (311) being radially offset with respect to said common axis (1), at least one of said rotor units being fixed to a driving member (39) by fixing means (14) coaxial with said common axis (1), said control member (310) being offset with respect to said common axis (1), said cross-piece (311) acting onto said control member (310).

6. A fan coupling unit as set forth in claim 5, said fixing means (14) being accessible through said slot (305).

7. A fan coupling unit as set forth in claim 1, said partial strips (114, 214, 314) having substantially constant widthes along said longitudinal axis (130, 230, 330).

* * * * *